Oct. 27, 1936.  G. E. TUSCAN ET AL  2,059,065
ICE CREAM HARDENER
Filed March 23, 1933   5 Sheets-Sheet 1

Inventors.
George E. Tuscan
Wilfred F. Mathewson
by Howard Smith & Tennant
Attys.

Oct. 27, 1936.    G. E. TUSCAN ET AL    2,059,065
ICE CREAM HARDENER
Filed March 23, 1933    5 Sheets—Sheet 2
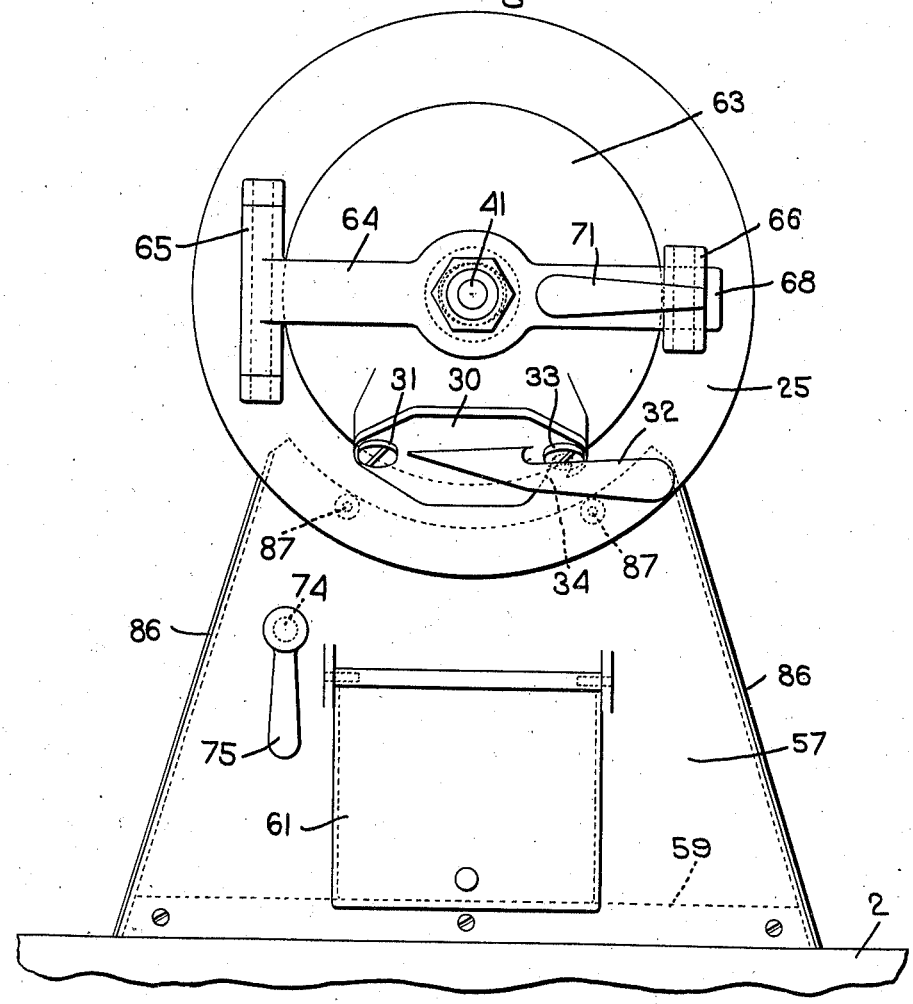
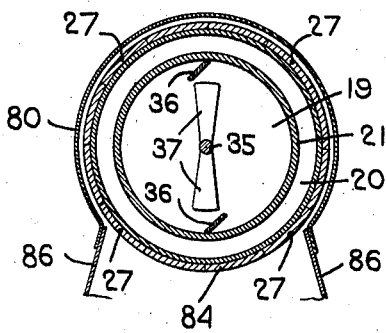
Inventors.
George E. Tuscan
Wilfred F. Mathewson
by Heard Smith & Tennant.
Attys.

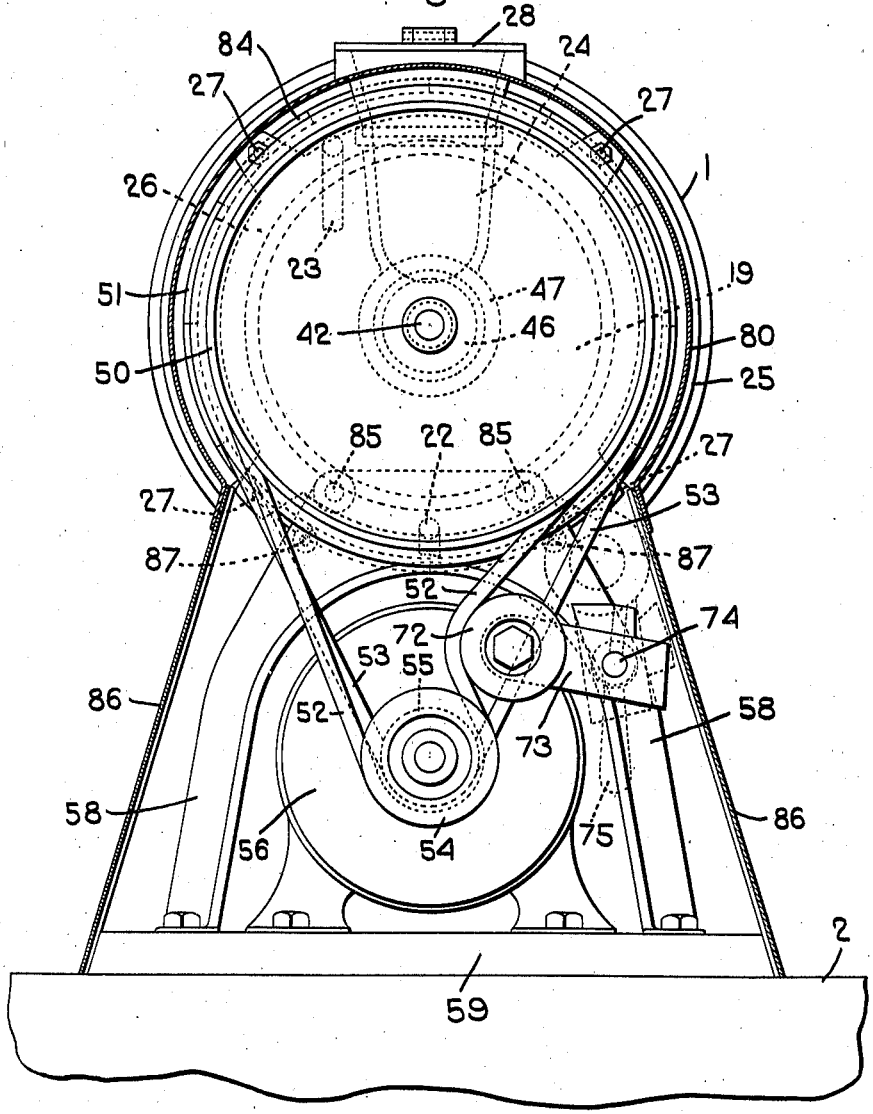

Oct. 27, 1936.  G. E. TUSCAN ET AL  2,059,065
ICE CREAM HARDENER
Filed March 23, 1933   5 Sheets-Sheet 5

Inventors.
George E. Tuscan
Wilfred F. Mathewson
by Heard Smith & Tennant.
Attys.

Patented Oct. 27, 1936

2,059,065

UNITED STATES PATENT OFFICE 2,059,065

ICE CREAM HARDENER

George E. Tuscan, Wollaston, and Wilfred F. Mathewson, North Weymouth, Mass.

Application March 23, 1933, Serial No. 662,262

5 Claims. (Cl. 62—95)

This invention relates to an ice cream freezer and hardener and has for one of its objects to provide a novel device of this type which comprises a cabinet containing a refrigerated hardening chamber or compartment in which the ice cream is hardened and an ice cream freezer mounted on the cabinet and arranged so that each batch of ice cream can be transferred from the freezer to a container in the hardening cabinet by the action of gravity.

Other objects of the invention are to improve generally ice cream freezers and hardeners in various particulars all as will be more fully hereinafter set forth.

In order to give an understanding of the invention we have illustrated in the drawings a selected embodiment thereof which will now be described after which the novel features will be pointed out in the appended claims.

Fig. 2 is a front view of the ice cream freezer;

Fig. 3 is an enlarged section on the line 3—3, Fig. 1;

Fig. 10 is a reduced section on the line 10—10, Fig. 1.

Figure 1:
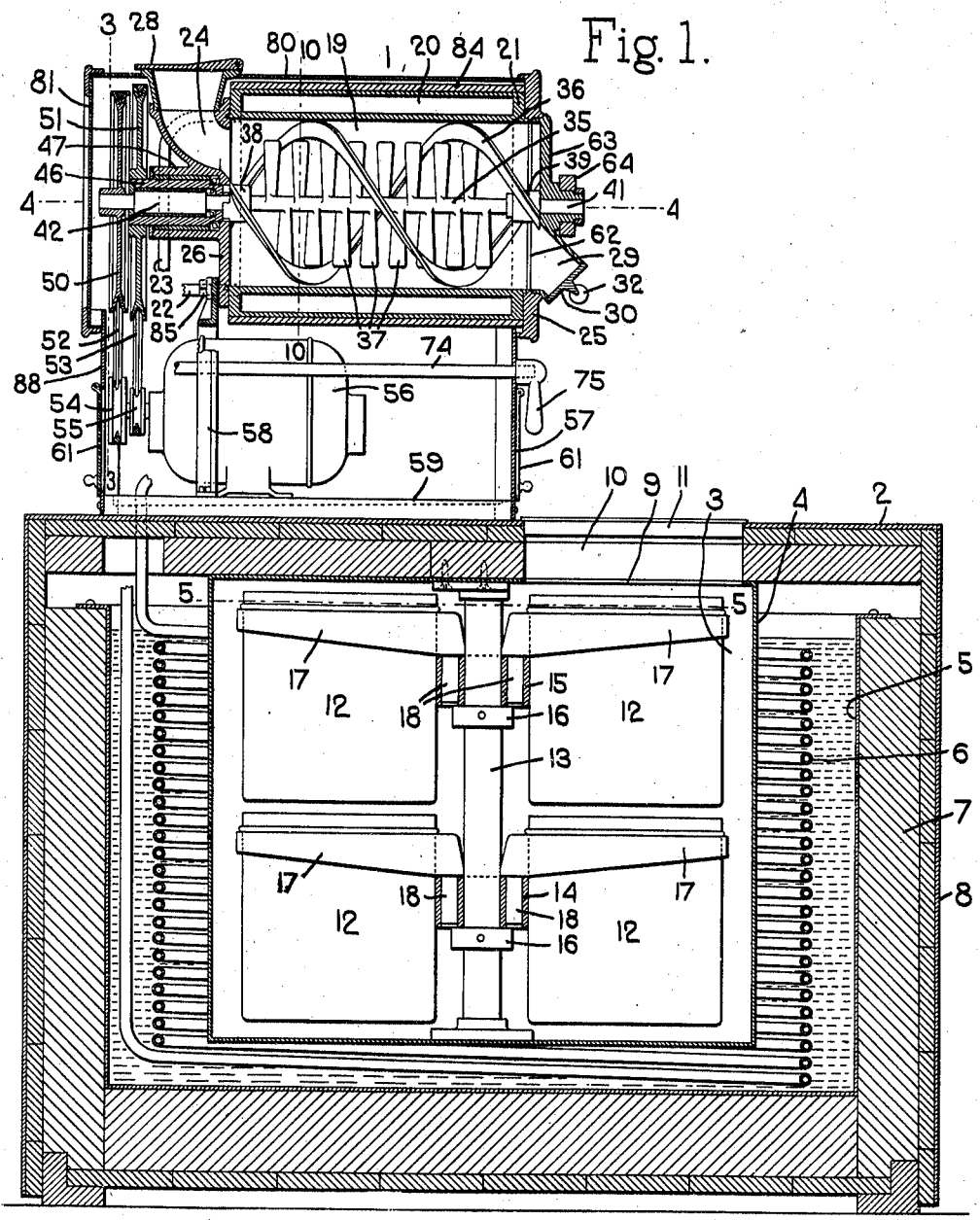
Fig. 1 is a vertical sectional view through an ice cream freezer and hardener embodying our invention.

The complete apparatus herein shown comprises an ice cream freezer indicated generally at 1 in which the ice cream is frozen to the desired extent and a hardening cabinet indicated generally at 2 which contains a refrigerated hardening chamber in which the ice cream is hardened after it is deposited from the freezer.

The hardening cabinet 2 may be made in any appropriate way and it contains within it a refrigerated hardening chamber 3. Such hardening chamber 3 is constituted by the space within a housing or container 4, preferably of sheet metal. For refrigerating the chamber 3 the housing 4 is shown as situated within a brine tank 5 formed within the hardening cabinet 2 and this tank contains not only brine but the refrigerating coil 6 by which the brine is kept at a low temperature.

The walls 7 of the hardening cabinet 2 outside of the brine tank are made of any suitable heat-insulating material and the side and top walls may conveniently have a metal exterior face as shown at 8.

The upper end of the hardening chamber 3 is provided with an opening 9 and the top of the cabinet 2 is also provided with an opening 10 which registers with the opening 9. 11 indicates a removable cover for normally closing the opening 10.

The ice cream to be hardened will preferably be deposited in cans 12 which may be placed within the hardening chamber 3 and for this purpose said chamber is shown as having a central post 13 on which are rotatively mounted two sleeves 14 and 15, each sleeve being supported on a collar 16 fixed to the post.

Each can is adapted to be supported in a can-supporting ring 17 that is provided on one side with a downwardly-extending pin 18 adapted to set into an opening formed in one of the supporting sleeves 14 or 15. Each sleeve 14 or 15 has provision for supporting a plurality of can-supporting rings 17, four such rings being carried by each sleeve in the illustrated embodiment of the invention.

As stated above each sleeve 15 is freely rotatable about the post 13 so that any one of the cans 12 in the upper tier can be brought around into position beneath the openings 9, 10.

The ice cream freezer 1 is formed with a horizontal cylindrical freezing chamber 19 which is surrounded by a refrigerating chamber 20 in which the refrigerant is circulated.

The freezing chamber 19 is formed within a cylindrical casting 21 which is cored to provide the refrigerating chamber 20 and the ends of the freezing chamber 19 are formed by heads 25 and 26 which close the ends of the cylindrical casting 21 and are tied together by tie rods 27.

22 and 23 indicate inlet and discharge pipes connected to the refrigerating chamber 20 and through which the refrigerating material is circulated in usual manner.

The head 26 is provided with an inlet opening 24 through which the material from which the batch of ice cream is made can be introduced into the freezing chamber 19, said inlet being provided with a cover 28 by which it is closed.

The head 25 is provided with an opening of substantially the same size as the diameter of the freezing chamber 19, which opening is normally closed by a door 63 that will be presently described. Said door is formed with a discharge opening 29 through which the frozen ice cream may be discharged from the freezing chamber 19 and this discharge opening 29 is situated over the openings 9 and 10 so that it is possible to discharge the ice cream directly from the freezing chamber 19 into a can 12 which is located in register with the openings 9 and 10. The discharge opening 29 is normally closed by a gate or valve 30 pivotally mounted at 31 and provided with a handle 32 by which it may be swung upwardly into open position. The gate is retained in its closed position by a headed stud 33, the shank of which is received in a slot 34 with which the gate is provided. This slot is open at the lower side of the gate so as to permit the latter to be swung upwardly to open the discharge opening 29. When the gate is swung downwardly into the position shown in Fig. 2 the slot 34 engages the stud 33 and locks the gate in closed position.

Situated inside of the freezing chamber 19 are stirring elements for keeping the ice cream stirred while it is being frozen. These stirring elements rotate about a horizontal axis and are indicated at 35 and 36 respectively. The element 35 is in the form of a shaft rotatively supported at its ends in the heads 25 and doors 63 and provided with a plurality of radial blades 37. The stirring element 36 is in the form of two spirally-shaped blades which are situated closely adjacent the wall of the chamber 19 and which encircle the stirring element 35. There are two such blades 36 and said blades are connected at their ends to spiders 38, 39. The heads 25 and 26 are provided with suitable supporting bearings for the spiders.

Figure 4:
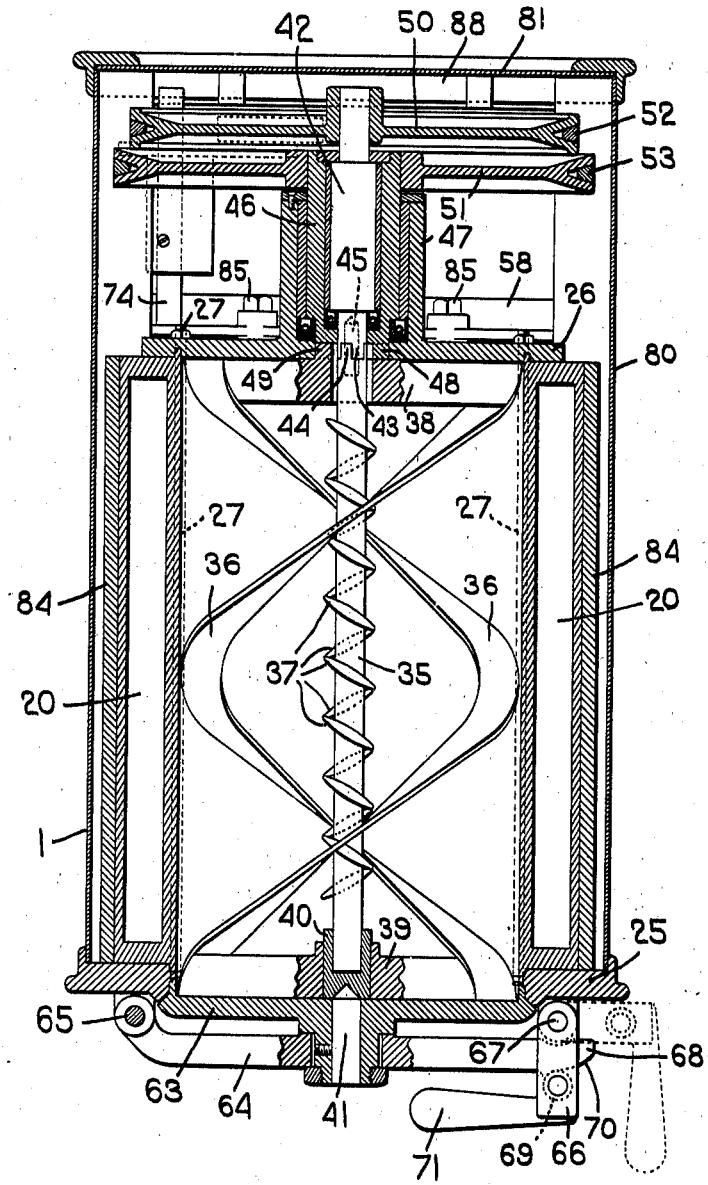
Fig. 4 is an enlarged section through the ice cream freezer on the line 4—4, Fig. 1.
Figure 5:
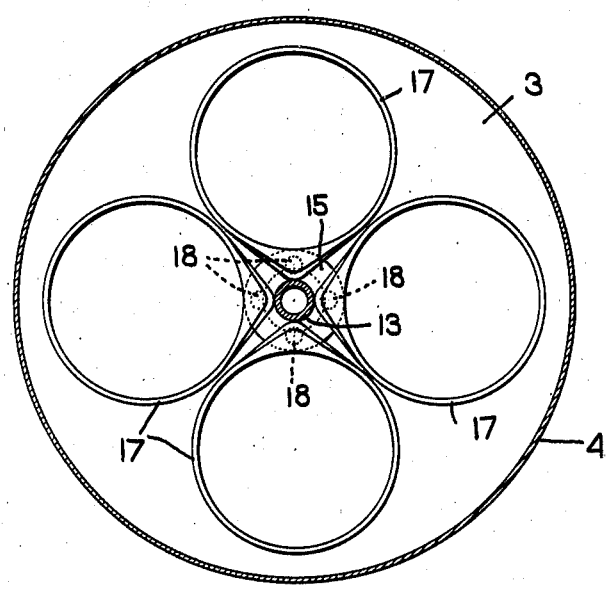
Fig. 5 is a section through the hardening compartment on the line 5—5, Fig. 1.
Figures 6, 7:
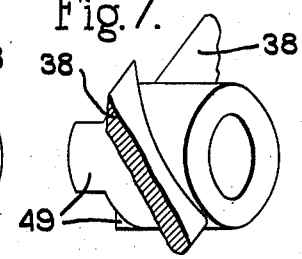
Fig. 6 is a perspective view of one element of the driving connection for one of the mixing elements of the freezer.
Fig. 7 is a fragmentary perspective view of the driving end of said element, that is, the end which engages with the driving member shown in Fig. 6.
Figures 8, 9:
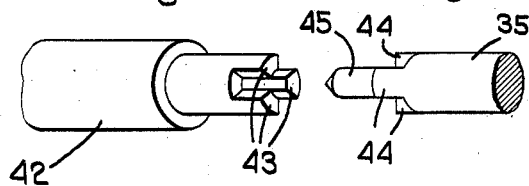
Fig. 8 is a fragmentary perspective view of the driving end of the shaft which rotates the paddle element of the freezer.
Fig. 9 is a fragmentary perspective view of the end of the paddle shaft which has driving engagement with the element shown in Fig. 7.

The shaft of the mixing element 35 is journalled at one end in a bearing member 40 which extends through and provides a bearing for the spider 39, said bearing member being centered by means of a pointed center pin 41 carried by the door 63 of the head 25, the point of the centering pin entering a correspondingly-shaped recess in the member 40 as best seen in Fig. 4. The other end of the shaft of the stirring member 35 is supported and rotated by a driving shaft 42. This shaft 42 is provided at its end with teeth or projections 43 which interleave with complemental projections 44 formed on the end of the shaft of the member 35.

The two shafts, that is, the shaft of the member 35 and the driving shaft 42 are held in axial alignment through a coupling pin 45, shown in dotted lines in Fig. 4, and one end of which enters an axial recess in the end of the shaft 35 and the other end of which enters an axial recess in the end of the driving shaft 42.

The stirring member 36 is rotated through the medium of a shaft 46 in the form of a sleeve which encircles the shaft 42 and forms a bearing therefor. This sleeve 46 is mounted for rotation in the hub 47 of the head 26 and on one end it is provided with projections 48 which are interleaved with corresponding complemental projections 49 formed on the spider 38.

The co-axial shafts 42 and 46 are driven through the medium of driving pulleys 50 and 51, said pulleys being connected by belts 52 and 53 with pulleys 54 and 55 on the shaft of a motor 56.

In the illustrated embodiment of the invention the motor 56 is shown as situated beneath the freezing chamber.

The shell enclosing the freezing chamber is supported at its front end on a vertically-arranged supporting plate 57 and at its rear end on a yoke-shaped supporting frame 58 which straddles the motor 56. Both the supporting plate 57 and the supporting frame 58 are secured to a base 59 which in turn is mounted on the hardening cabinet 2.

The upper edge of the supporting plate 57 forms a cradle on which the ice cream freezer rests and said upper edge is secured to the head 25 by means of bolts 87. The yoke 58 which straddles the motor 56 is secured to the head 26 by means of bolts 85.

The pulleys and the motor are preferably enclosed in a suitable casing and for this purpose there is provided a second vertically-arranged plate 88 at the rear of the pulleys which is secured at its lower end to the base 59 and said plates 88 and 57 are connected along the sides by side plates 86, said plates 86, 88 and 57 forming a casing enclosing the motor.

The ice cream freezer is enclosed by a metal shell 80, the lower edges of which are secured to the upper edges of the side plates 86.

The vertically-arranged plates 57 and 88 are provided with openings closed by swinging doors 60, 61 through which access may be had to the parts on the interior of the casing. The rear plate 88 is also provided with an opening in line with the pulleys 50, 51, which opening is closed by a removable cover or closure 81.

The door 63 with which the head 25 is provided is mounted so that it can be opened and closed. When the door is opened the stirring elements 35 and 36 can be removed through the open end 62 of the freezing chamber 19.

This door or closure 63 is shown as carried by an arm 64 and is pivoted to the head 25 at 65. The door is locked in its closed relation by means of a swinging locking yoke 66 pivoted to the head 25 at 67 and adapted to embrace the end 68 of the arm 64. The yoke 66 carries a roll 69 and the end 68 of the arm 64 has the cam surface 70 so that when the yoke is swung into the full line position Fig. 4 the roll by its engagement with the cam surface 70 will force the door or closure 63 firmly to its seat. This locking yoke 66 is provided with a handle 71 by which it may be swung from operative position shown in full lines Fig. 4 to the inoperative position shown in dotted lines.

The centering pin 41 is shown as carried by the door or closure 63 and when said door is opened this centering pin is thus withdrawn from the bearing member 40.

Both the stirrers may be withdrawn through the open end 62 of the freezing chamber 19.

The connection between the stirring elements and the driving shafts 42 and 46 are such as to readily permit these stirring elements to be separated from the shafts.

The stirring elements 35, 36 not only function to stir or mix the ice cream during the freezing process but they also serve to facilitate the discharge of the ice cream through the discharge opening 29 when the ice cream mass has been frozen to the desired amount and when it is ready to be deposited in one of the cans 12 of the hardening cabinet.

The blades 37 are arranged at an angle as shown in Fig. 4 and the rotation of the stirrer 35 is in a direction which tends to force the material within the chamber 19 toward the left in Fig. 1 or toward the head 25.

The spiral blades 36 are so shaped and their direction of rotation is such that they tend to force the material in the chamber 19 to the right in Fig. 1 or toward the opening 62. When both stirring elements are operating, therefore, the blades 37 tend to force the central portion of the mass of ice cream toward the left Fig. 1 while the spiral blades 36 tend to force the outer portion of the ice cream mass toward the right. When the ice cream has been frozen to the proper consistency and it is desired to discharge it from the chamber 19 then the stirring element 35 is rendered inoperative and the blades 36 are rotated thereby forcing the ice cream toward the right Fig. 1 and if at this time the gate 30 is opened the ice cream will be discharged through the discharge opening 29 into one of the containers 12.

The provision herein shown for rendering the stirring element 35 inoperative at such time as the ice cream is to be discharged comprises a belt tightener 72 co-operating with the belt 53. This belt tightener is in the form of a roll carried by an arm 73 mounted on a shaft 74 that is journalled in the supporting frames 57 and 58. The belt tightener normally is in the position shown in Fig. 3 in which position it causes the belt 52 to be sufficiently tight to properly drive its pulley 50. When this belt tightener is swung into the dotted line position Fig. 3 the belt 52 is slackened so that it will fail to drive its pulley 50 thereby rendering the stirring element 35 inoperative. When, therefore, the belt tightener is in the dotted line position the stirring blade 36 only will be rotated and the blades 37 will be inoperative. When the parts are operating in this way and the gate 30 is opened the blades 36 will function to discharge the ice cream through the discharge port 29. The constructional features of the ice cream freezer are not claimed herein but are made the subject of a separate application Serial No. 704,902, filed January 2, 1934.

While we have illustrated herein a selected embodiment of the invention we do not wish to be limited to the constructional features shown.

We claim.

1. A hardening cabinet for an ice cream freezer comprising a refrigerated hardening chamber having an opening in its top, a stationary supporting post situated within said chamber at one side of the opening, said post being anchored at its upper and lower ends to the stationary top and bottom of said chamber, a collar fast on said post, a sleeve rotatively mounted on the post and supported by the collar, said sleeve having a plurality of openings extending parallel to the post, a plurality of separate can-supporting rings, each having a depending pin to be received in one of the openings of the sleeve, said rings being removable from the sleeve, rotation of the sleeve on the post bringing the individual rings and the cans supported thereby into register with the opening in the chamber.

2. A device of the class described comprising a refrigerated hardening chamber having an opening in its top, a stationary supporting post situated within said chamber at one side of the opening, the upper and lower ends of one post being anchored to the stationary top and bottom of said hardening chamber, two collars fast on said post, two sleeves rotatively mounted on said post, one sleeve being supported by each collar, each sleeve having a plurality of openings extending parallel to the post but spaced therefrom, two sets of can-supporting rings, one for each sleeve, each can-supporting ring being widened on one side and provided at its widened portion with a depending pin adapted to be removably received in one of the openings in a sleeve, rotation of each sleeve bringing successive can-supporting rings into register with the opening of the top of the cabinet and the removability of the can-supporting rings of the upper set providing for placing cans in or removing them from the rings of the lower set.

3. In an ice cream freezing apparatus, in combination, a hardening cabinet having a refrigerated hardening chamber provided with an opening in its top, a removable closure for said opening, a supporting post within said chamber, can-carrying means rotatably mounted on said post and adapted to support a plurality of cans any one of which may be brought into register with said opening by rotation of said can-carrying means, an ice cream freezer mounted on the hardening cabinet and provided with a delivery spout situated over said opening, and means for causing the frozen ice cream to be discharged from the freezer through the delivery spout and directly into a can situated in line with said opening.

4. A device of the class described comprising a refrigerated hardening chamber having an opening in its top, a stationary supporting post situated within said chamber at one side of the opening, said post being anchored at its upper and lower ends to the stationary top and bottom of said chamber, a collar fast on said post, a sleeve rotatably mounted on the post and supported by the collar, said sleeve having a plurality of openings extending parallel to the post, a plurality of can-supporting rings, each having a depending pin to be received in one of the openings of the sleeve, said rings being removable from the sleeve and rotation of the sleeve on the post bringing the individual rings and the cans supported thereby into register with the opening in the chamber, and an ice cream freezer supported on the chamber and having a discharge spout situated to deliver ice cream directly into a can situated within the hardening chamber in register with the opening thereof.

5. An ice cream freezing apparatus comprising a casing containing a brine tank, a hardening chamber partially submerged in the brine in the brine tank, the top of said chamber fitting and engaging the top of the casing and providing a tight joint therewith, the top of the casing and the top of the chamber having aligned openings, a post in said hardening chamber at one side of the aligned openings, a can-supporting member rotatably mounted on said post and having provision for removably supporting a plurality of cans, the rotation of said member bringing any can into register with the aligned openings and in position to receive ice cream directly from an ice cream freezer supported on said hardening cabinet.

GEORGE E. TUSCAN.
WILFRED F. MATHEWSON.